United States Patent
Caruso et al.

(10) Patent No.: US 10,738,759 B2
(45) Date of Patent: *Aug. 11, 2020

(54) METHODS FOR MANUFACTURING SPAR CAPS FOR WIND TURBINE ROTOR BLADES

(71) Applicant: General Electric Company, Schenectady, NY (US)

(72) Inventors: Christopher Daniel Caruso, Greenville, SC (US); Aaron A. Yarbrough, Greenville, SC (US); Daniel Alan Hynum, Simpsonville, SC (US); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 578 days.

This patent is subject to a terminal disclaimer.

(21) Appl. No.: 15/428,568

(22) Filed: Feb. 9, 2017

(65) Prior Publication Data

US 2018/0223797 A1 Aug. 9, 2018

(51) Int. Cl.
*F03D 1/06* (2006.01)
*B29C 70/52* (2006.01)
(Continued)

(52) U.S. Cl.
CPC ........ *F03D 1/0675* (2013.01); *B29C 33/0016* (2013.01); *B29C 51/266* (2013.01);
(Continued)

(58) Field of Classification Search
CPC ........ F03D 1/0675; F03D 1/065; F03D 13/10; B33Y 80/00; Y02P 70/523; Y02E 10/721;
(Continued)

(56) References Cited

U.S. PATENT DOCUMENTS 5,002,712 A * 3/1991 Goldmann ............ B29B 15/122
264/136
5,476,704 A 12/1995 Kohler
(Continued)

FOREIGN PATENT DOCUMENTS

DE 102012219224 B3 3/2014
DK 200801457 A 9/2009
(Continued)

OTHER PUBLICATIONS

U.S. Appl. No. 14/552,517, filed Nov. 25, 2014.
(Continued)

*Primary Examiner* — Jun S Yoo
(74) *Attorney, Agent, or Firm* — Dority & Manning, P.A.

(57) ABSTRACT

The present disclosure is directed methods for manufacturing spar caps for wind turbine rotor blades. In certain embodiments, the method includes forming an outer frame of the spar cap via at least one of three-dimensional (3D) pultrusion, thermoforming, or 3D printing. As such, the outer frame has a varying cross-section that corresponds to a varying cross-section of the rotor blade along a span thereof. The method also includes arranging a plurality of structural materials (e.g. layers of pultruded plates) within the pultruded outer frame of the spar cap and infusing the structural materials and the outer frame together via a resin material so as to form the spar cap. The resulting spar cap can then be easily incorporated into conventional rotor blade manufacturing processes and/or welded or bonded to an existing rotor blade.

9 Claims, 14 Drawing Sheets

(51) Int. Cl.
  *B29C 51/26* (2006.01)
  *B33Y 80/00* (2015.01)
  *B29D 99/00* (2010.01)
  *B29C 33/00* (2006.01)
  *B29C 64/106* (2017.01)
  B29K 105/06 (2006.01)
  B29L 31/08 (2006.01)
  B29C 51/12 (2006.01)
  B29C 51/10 (2006.01)

(52) U.S. Cl.
  CPC ............ *B29C 64/106* (2017.08); *B29C 70/52* (2013.01); *B29D 99/0028* (2013.01); *B33Y 80/00* (2014.12); B29C 51/10 (2013.01); B29C 51/12 (2013.01); B29K 2105/06 (2013.01); B29K 2995/0082 (2013.01); B29L 2031/085 (2013.01); F05B 2230/24 (2013.01); F05B 2280/6003 (2013.01); Y02E 10/721 (2013.01); Y02P 70/523 (2015.11)

(58) Field of Classification Search
  CPC ...... B29L 2031/085; B29K 2995/0082; B29K 2105/06; F05B 2280/6003; F05B 2230/24; B29C 70/865; B29C 70/84; B29C 64/106; B29C 33/0016; B29C 51/266; B29C 70/52; B29C 51/10; B29C 51/12; E04C 3/29; B29D 99/0003; B29D 99/0028
  See application file for complete search history.

(56) References Cited

U.S. PATENT DOCUMENTS

| | | |
|---|---|---|
| 7,438,533 B2 | 10/2008 | Eyb et al. |
| 7,503,752 B2 | 3/2009 | Gunneskov et al. |
| 7,625,185 B2 | 12/2009 | Wobben |
| 7,758,313 B2 | 7/2010 | Eyb |
| 7,963,747 B2 | 6/2011 | Cairo |
| 8,114,329 B2 | 2/2012 | Karem |
| 8,353,674 B2 | 1/2013 | Bech |
| 8,382,440 B2 | 2/2013 | Baker et al. |
| 8,506,258 B2 | 8/2013 | Baker et al. |
| 8,540,491 B2 | 9/2013 | Gruhn et al. |
| 8,545,744 B2 | 10/2013 | Jones |
| 8,777,578 B2 | 7/2014 | Hancock et al. |
| 2007/0160479 A1 | 7/2007 | Livingston et al. |
| 2008/0181781 A1 | 7/2008 | Livingston et al. |
| 2008/0206059 A1 | 8/2008 | Hancock et al. |
| 2009/0068017 A1 | 3/2009 | Rudling |
| 2009/0175731 A1 | 7/2009 | Burchardt et al. |
| 2009/0196756 A1 | 8/2009 | Althoff |
| 2010/0310380 A1 | 12/2010 | Bech |
| 2011/0031758 A1 | 2/2011 | Mitsuoka et al. |
| 2011/0037191 A1 | 2/2011 | Stiesdal |
| 2011/0135485 A1 | 6/2011 | Wang |
| 2012/0027609 A1* | 2/2012 | Ogde ............... B29C 70/86 416/226 |
| 2012/0039720 A1 | 2/2012 | Bech |
| 2012/0183408 A1 | 7/2012 | Noerlem |
| 2013/0055677 A1* | 3/2013 | Hayden ............ B29C 70/865 52/835 |
| 2013/0333823 A1 | 12/2013 | Hedges et al. |
| 2013/0340385 A1 | 12/2013 | Hayden et al. |
| 2014/0003956 A1 | 1/2014 | Lull et al. |
| 2014/0154091 A1 | 6/2014 | Baker et al. |
| 2014/0271217 A1 | 9/2014 | Baker |
| 2014/0301859 A1 | 10/2014 | Hancock et al. |
| 2015/0023799 A1 | 1/2015 | Wetzel et al. |
| 2015/0369212 A1 | 12/2015 | Baker et al. |
| 2016/0047252 A1 | 2/2016 | Merzhaeuser et al. |
| 2016/0146184 A1 | 5/2016 | Caruso et al. |
| 2017/0008239 A1* | 1/2017 | Zhang ............... B29B 11/16 |
| 2018/0319106 A1* | 11/2018 | Johnson ............ B29C 51/14 |

FOREIGN PATENT DOCUMENTS

| | | |
|---|---|---|
| EP | 1808598 A1 | 7/2007 |
| EP | 2113373 A1 | 11/2009 |
| EP | 2441571 A1 | 4/2012 |
| EP | 2617558 A1 | 7/2013 |
| EP | 2682256 A1 | 1/2014 |
| EP | 2752577 A2 | 7/2014 |
| JP | 2002137307 | 5/2002 |
| KR | 10-2014-0110951 A | 9/2014 |
| NL | 8104019 | 3/1983 |
| WO | WO2009/133143 A1 | 11/2009 |
| WO | WO2010/083921 A2 | 7/2010 |
| WO | WO2011/113812 A1 | 9/2011 |
| WO | WO2012/161741 A2 | 11/2012 |
| WO | WO2013/087078 A1 | 6/2013 |
| WO | WO2014/044280 A1 | 3/2014 |
| WO | WO2014/063944 A1 | 5/2014 |
| WO | WO2014/079456 A1 | 5/2014 |
| WO | WO2014/147222 A2 | 9/2014 |
| WO | WO2015/142904 A1 | 9/2015 |

OTHER PUBLICATIONS

U.S. Appl. No. 14/560,266, filed Dec. 4, 2014.
U.S. Appl. No. 14/552,518, filed Nov. 25, 2014.
U.S. Appl. No. 15/428,620, filed Feb. 9, 2017.
PCT Search Report, dated Jan. 30, 2019.

* cited by examiner

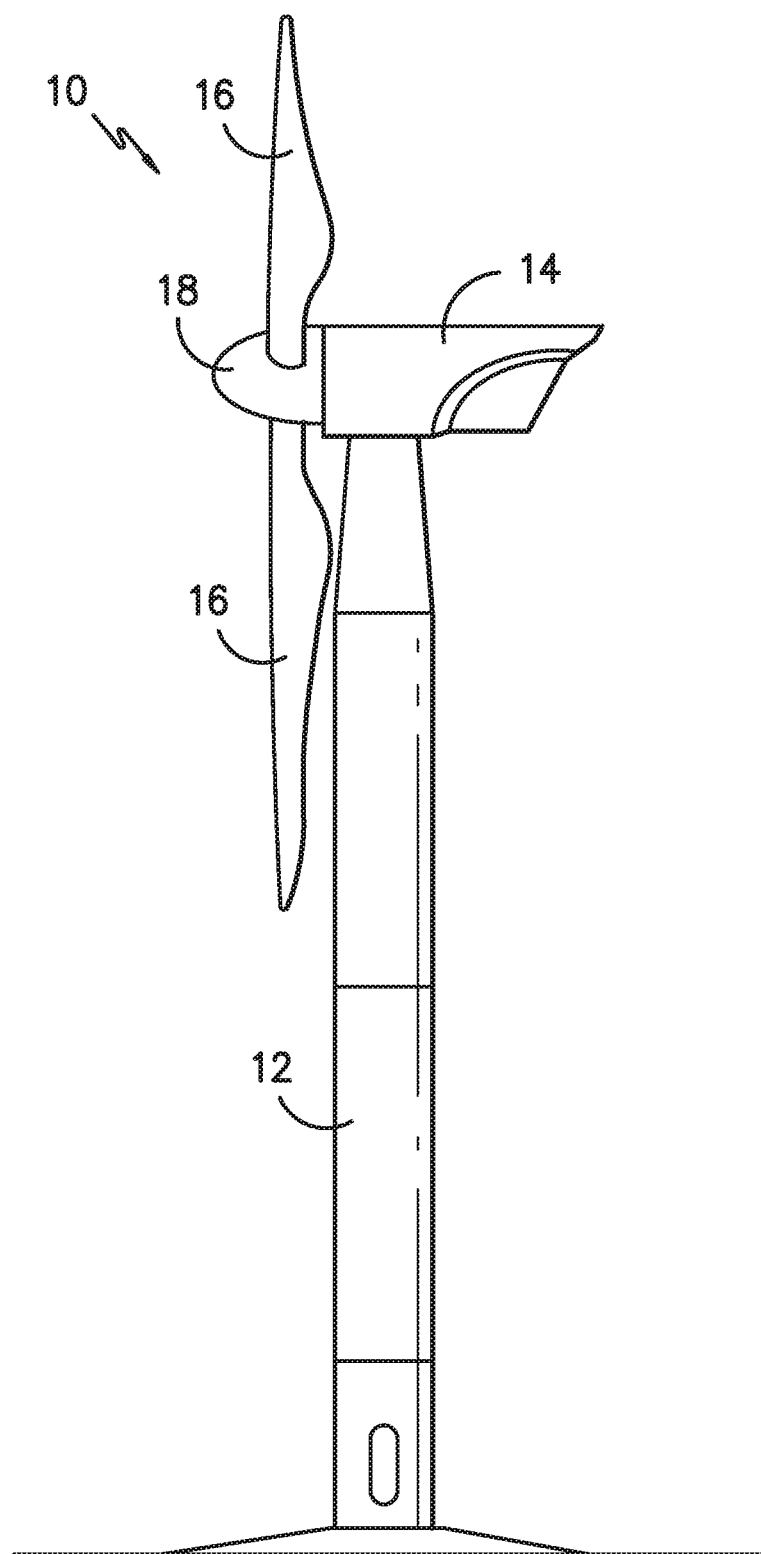
FIG. -1-

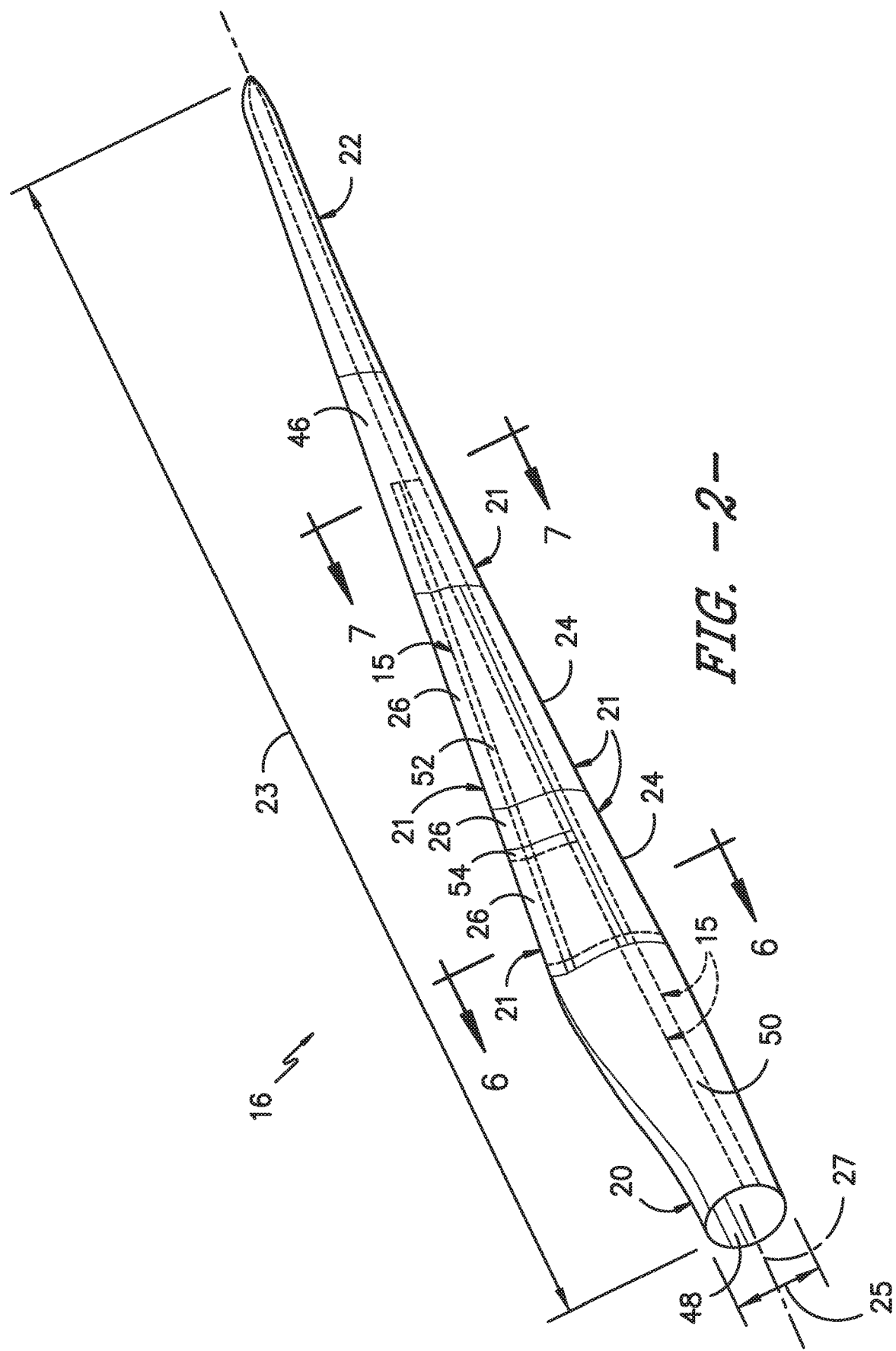
FIG. -2-

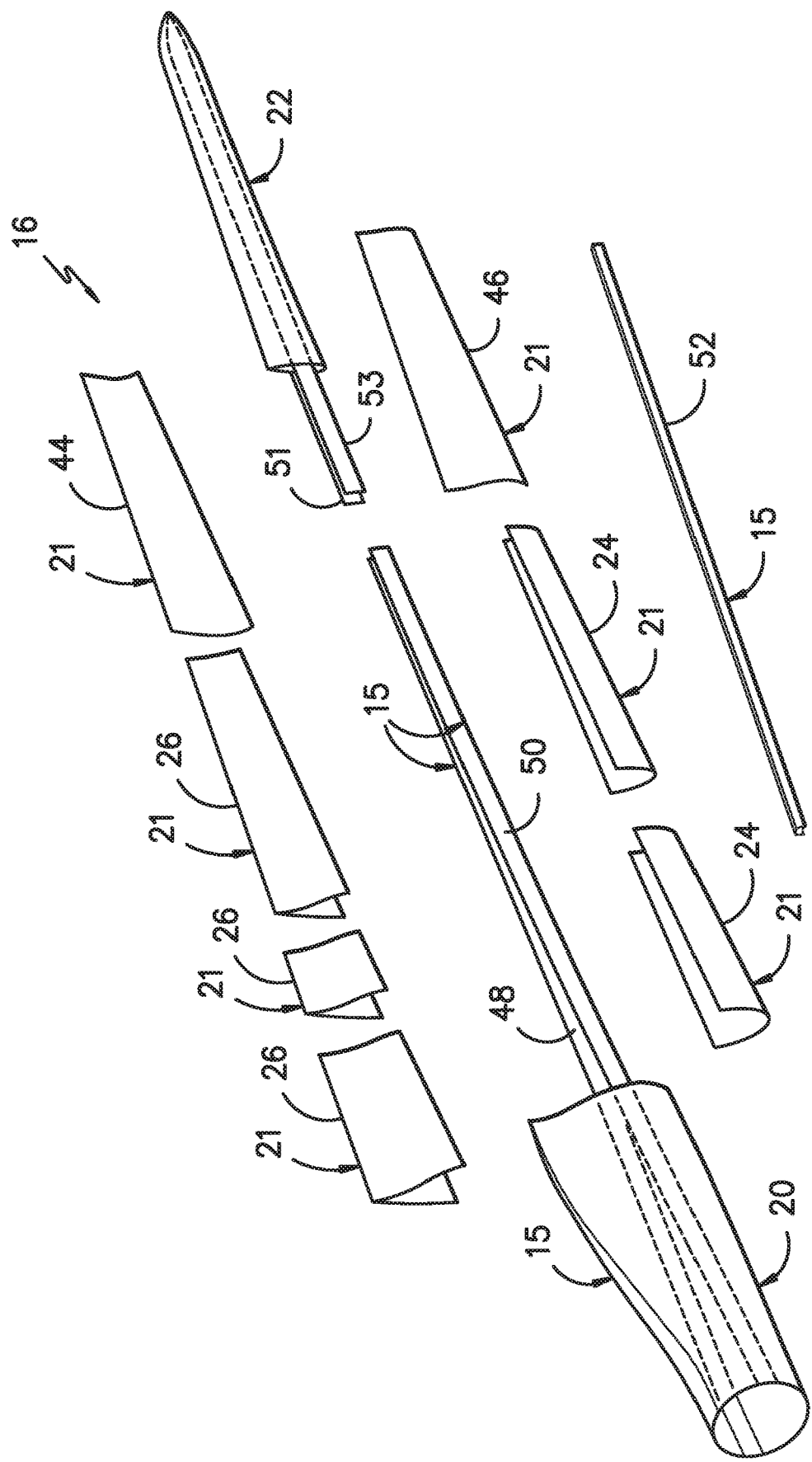
FIG. -3-

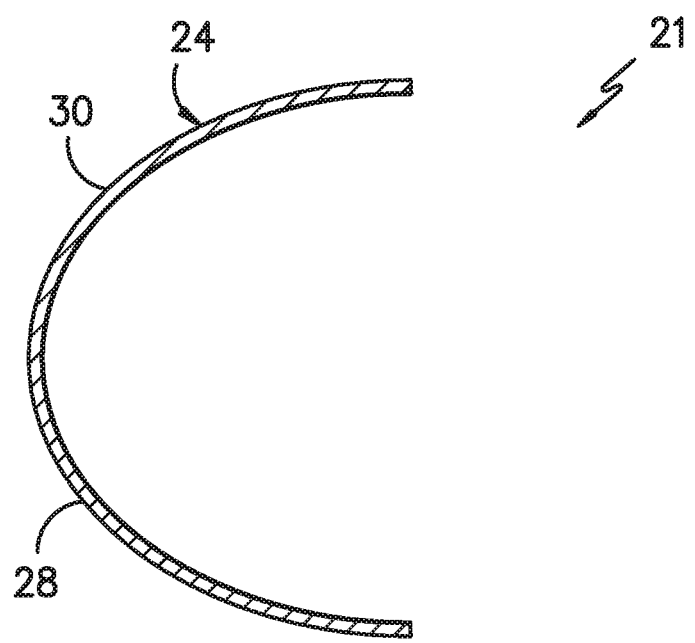
FIG. -4-
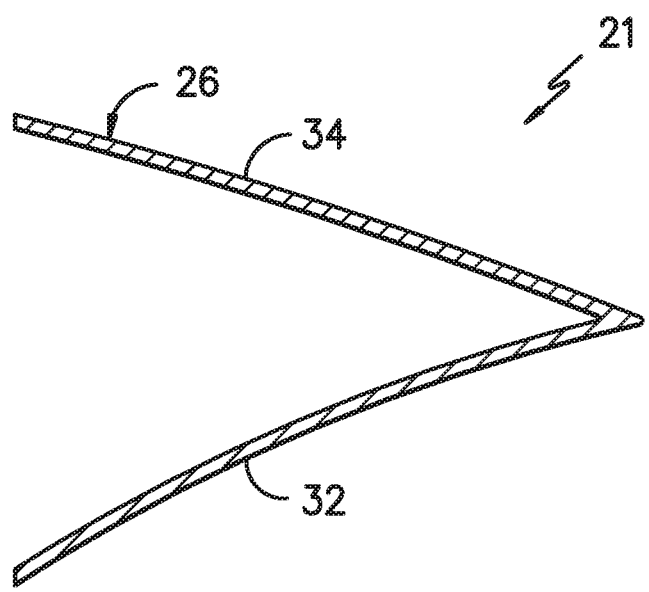
FIG. -5-

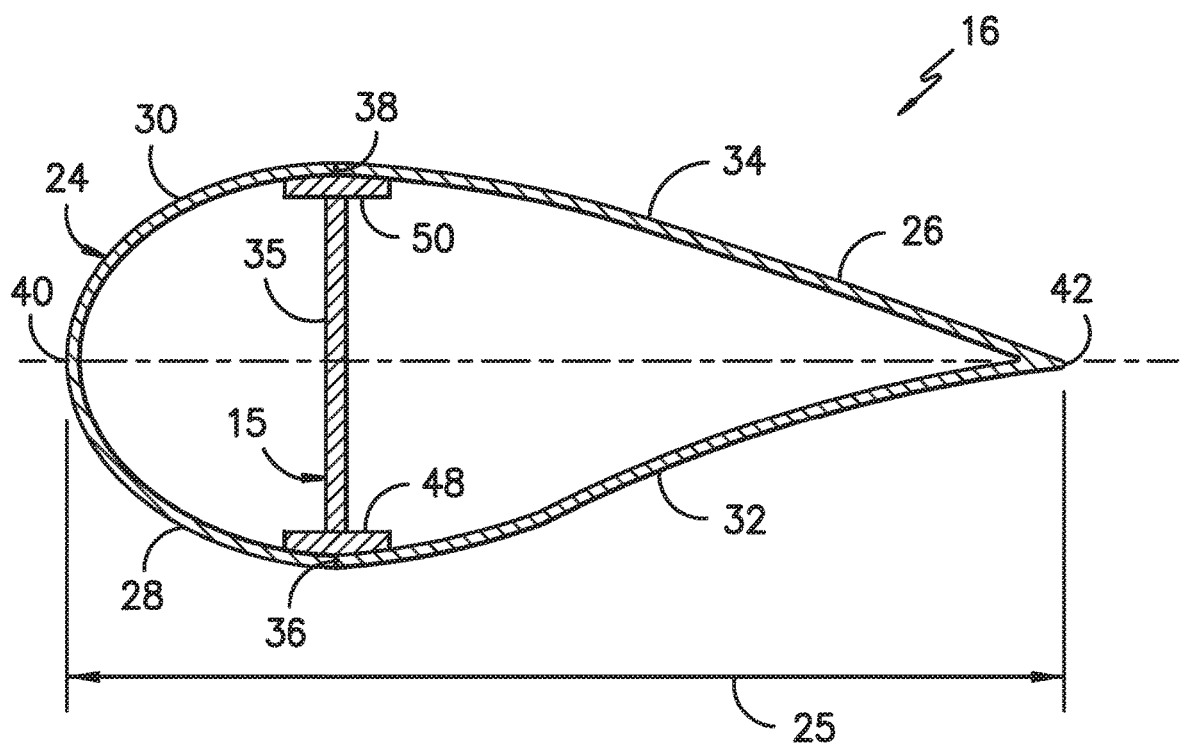
FIG. -6-
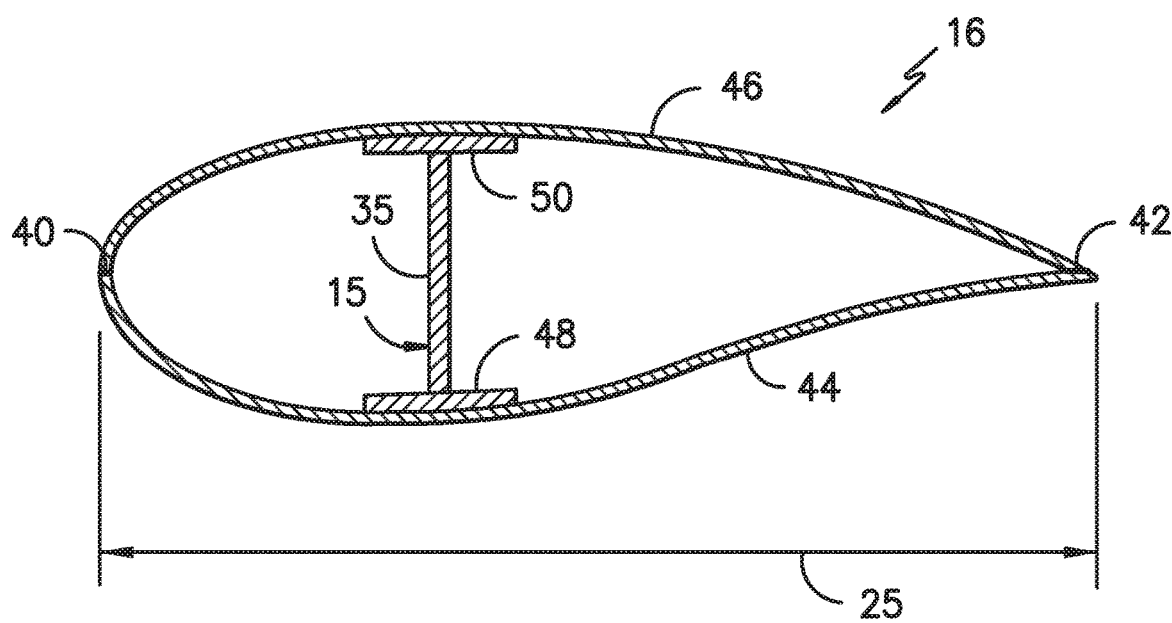
FIG. -7-

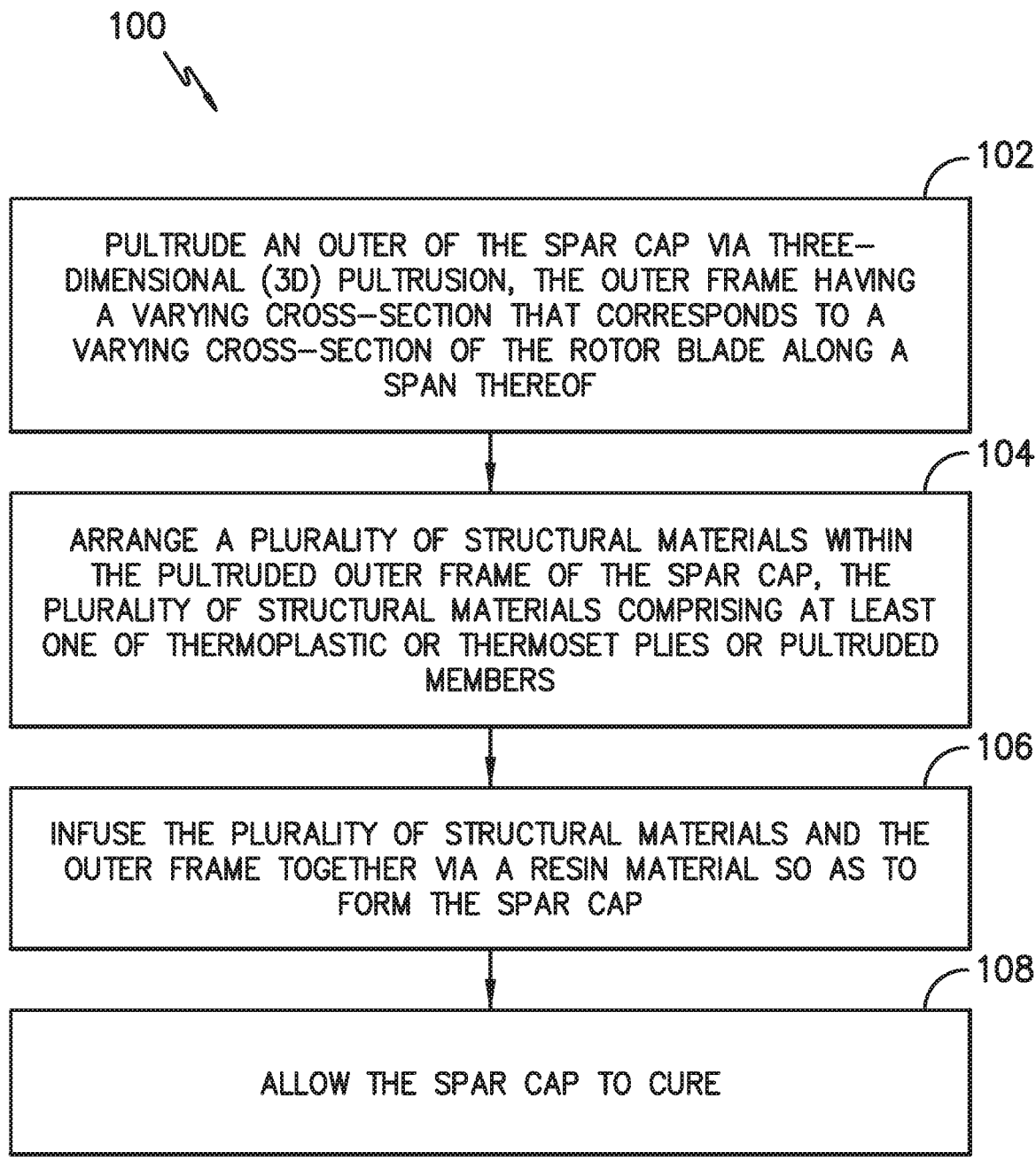
FIG. -8-

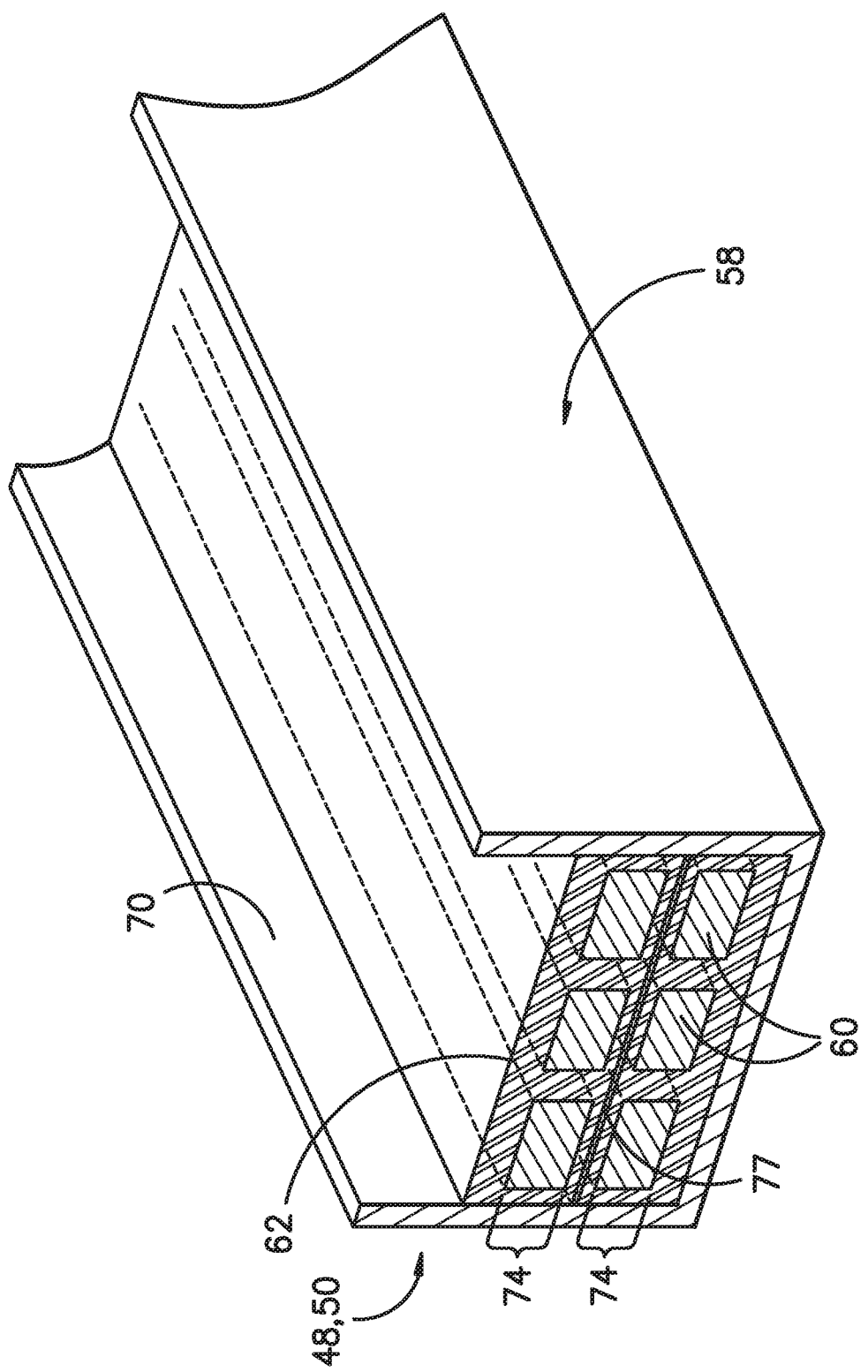

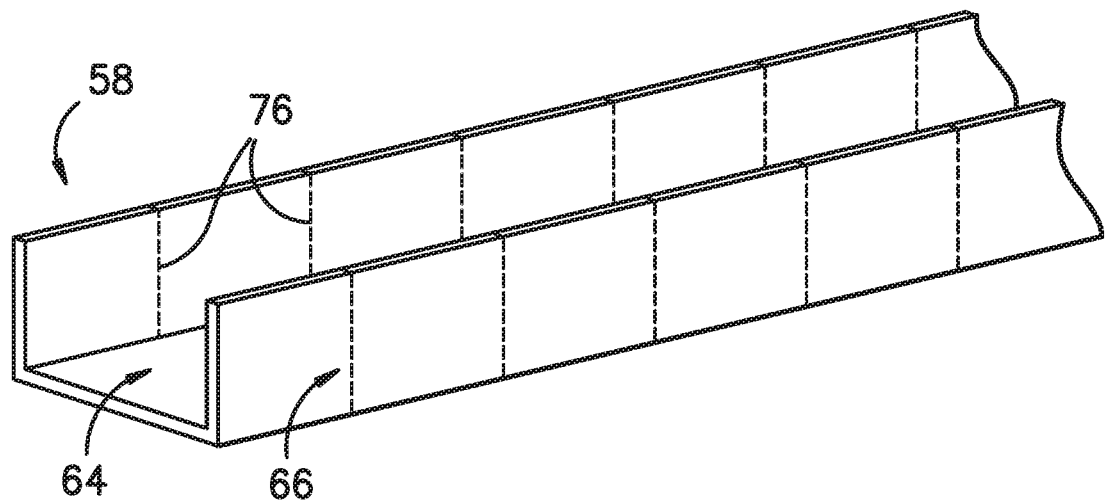
FIG. -10-
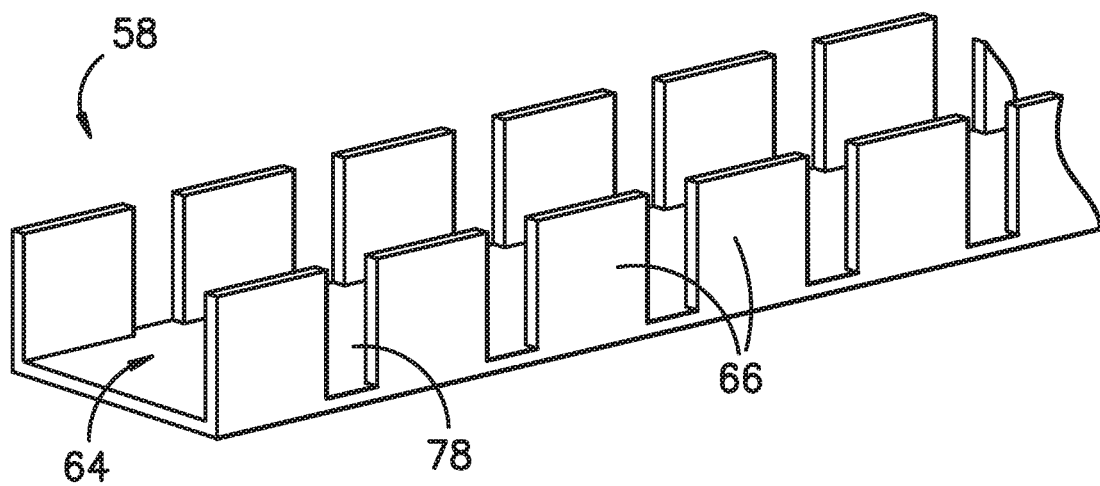
FIG. -11-

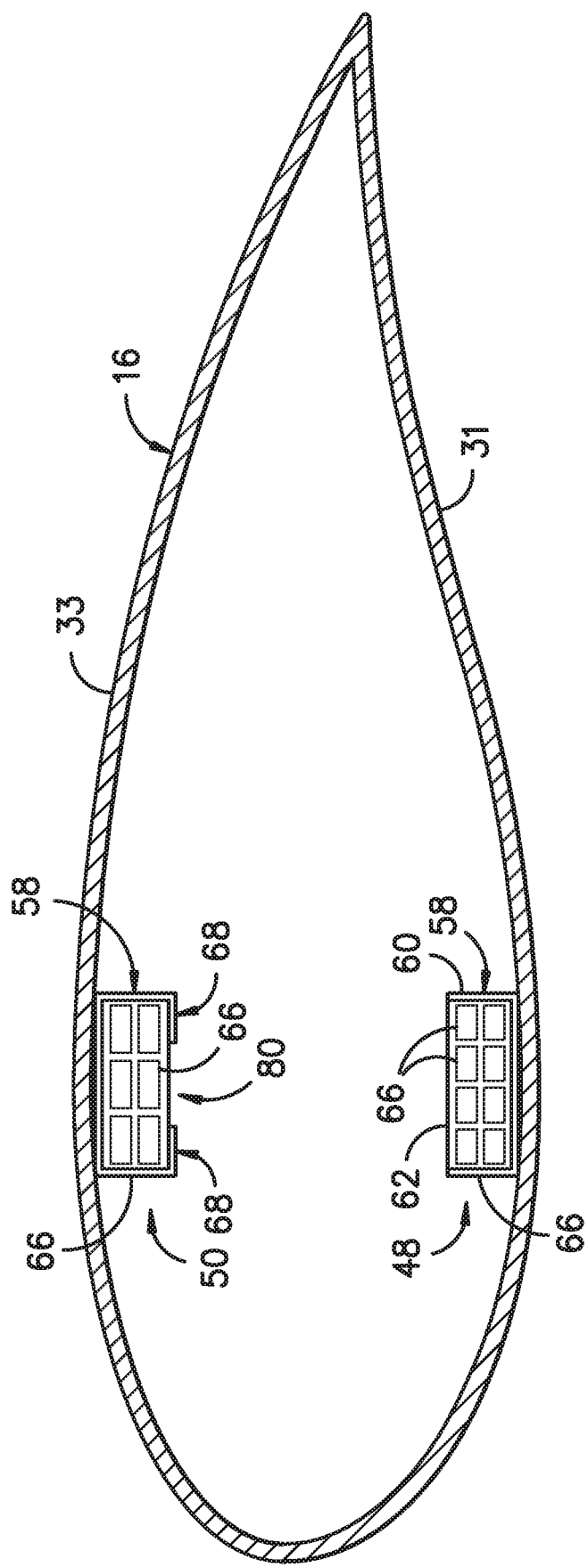

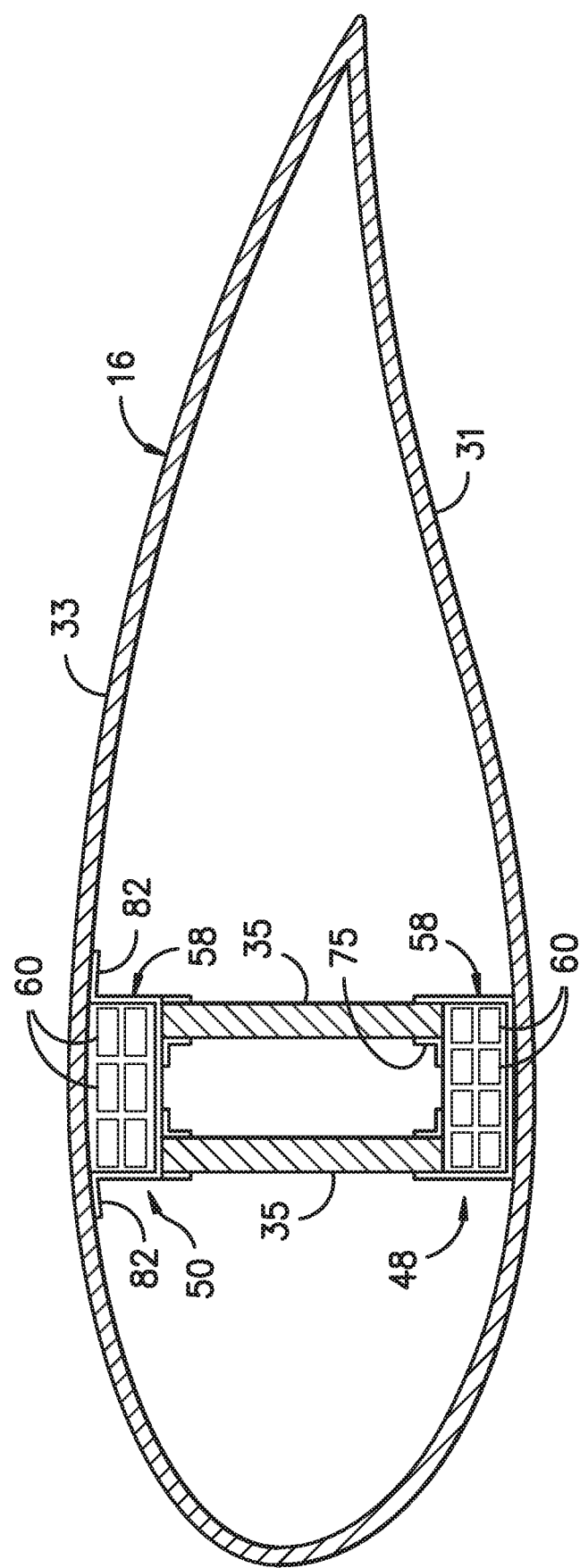
FIG. -13-

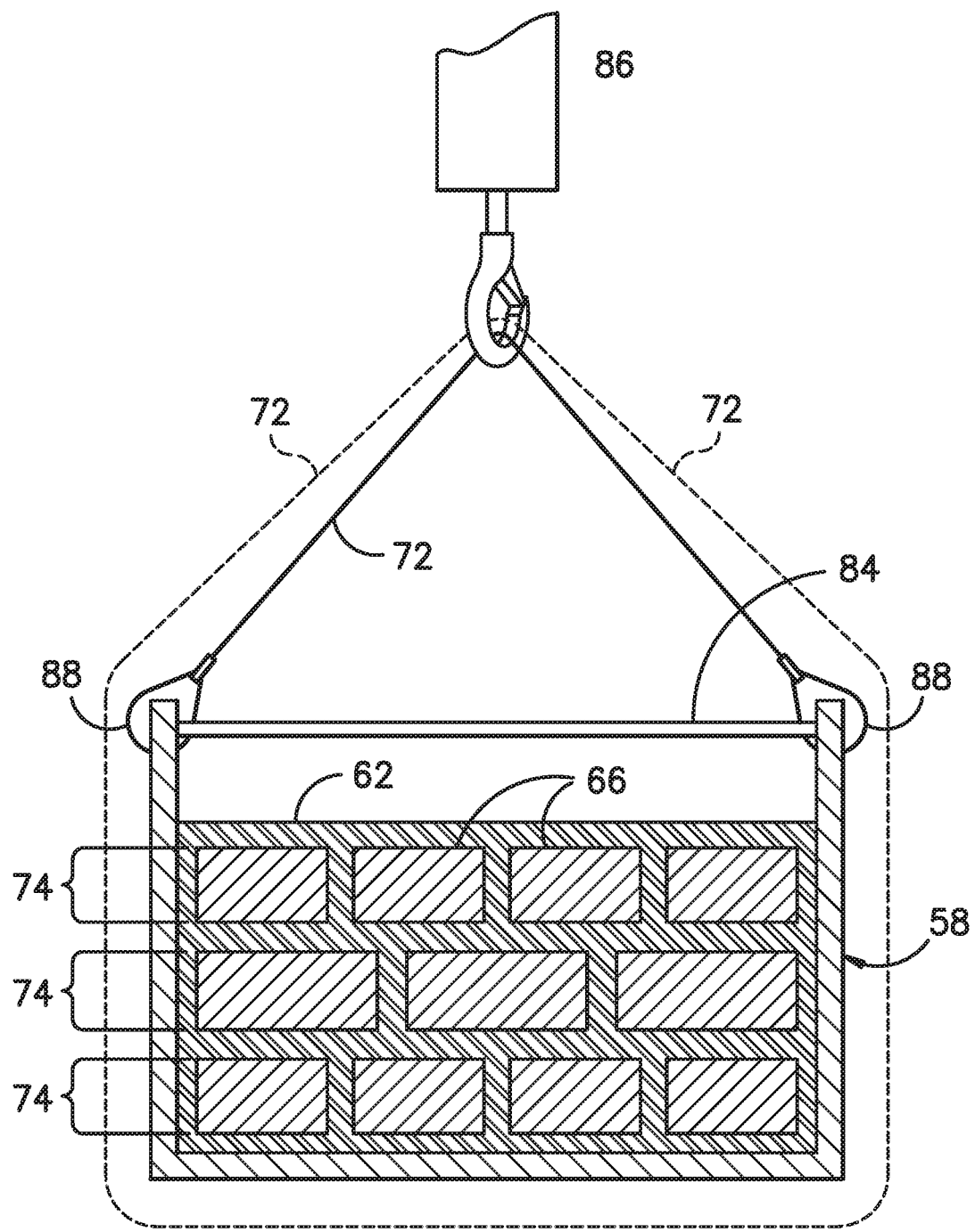
FIG. -14-

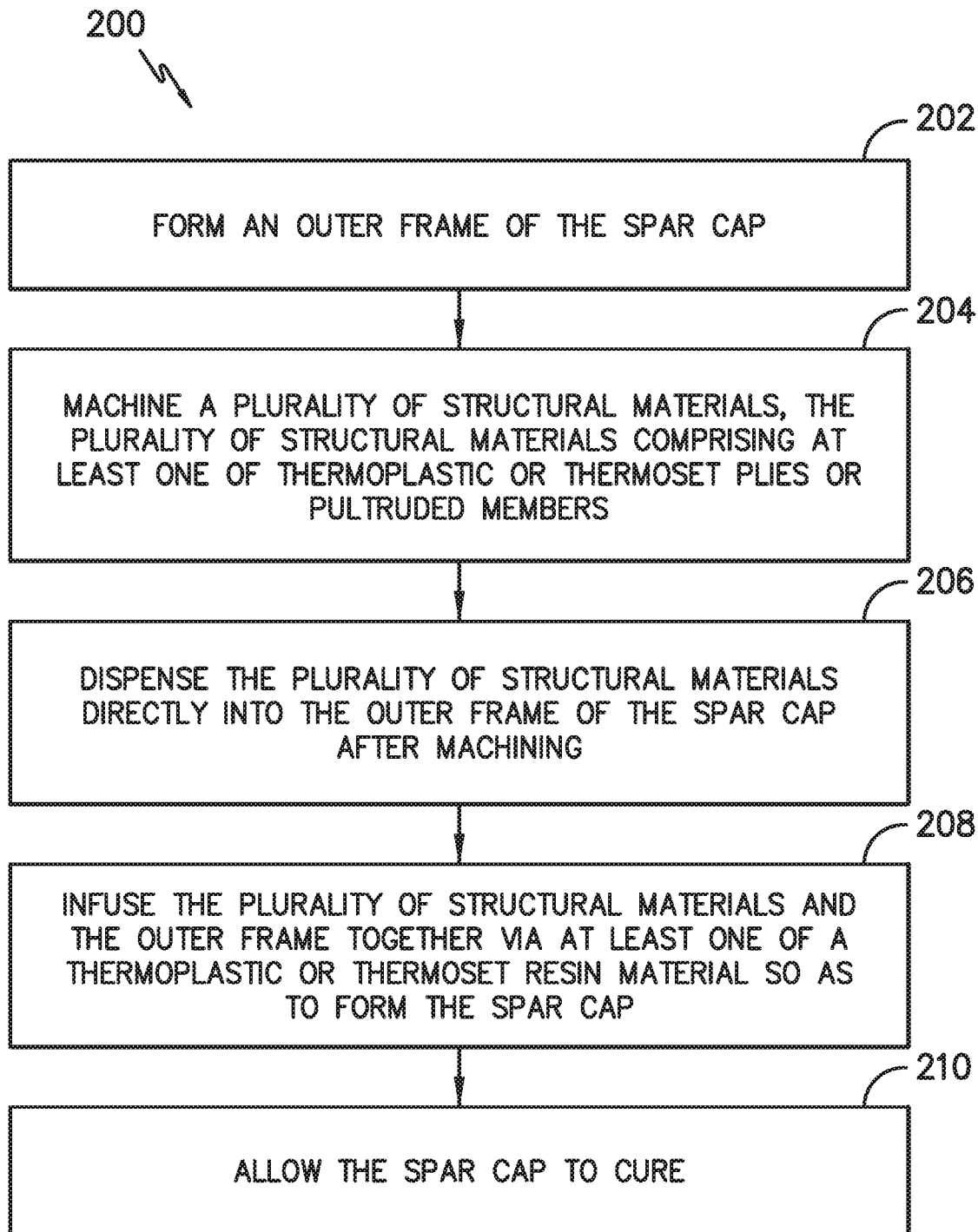
FIG. -15-

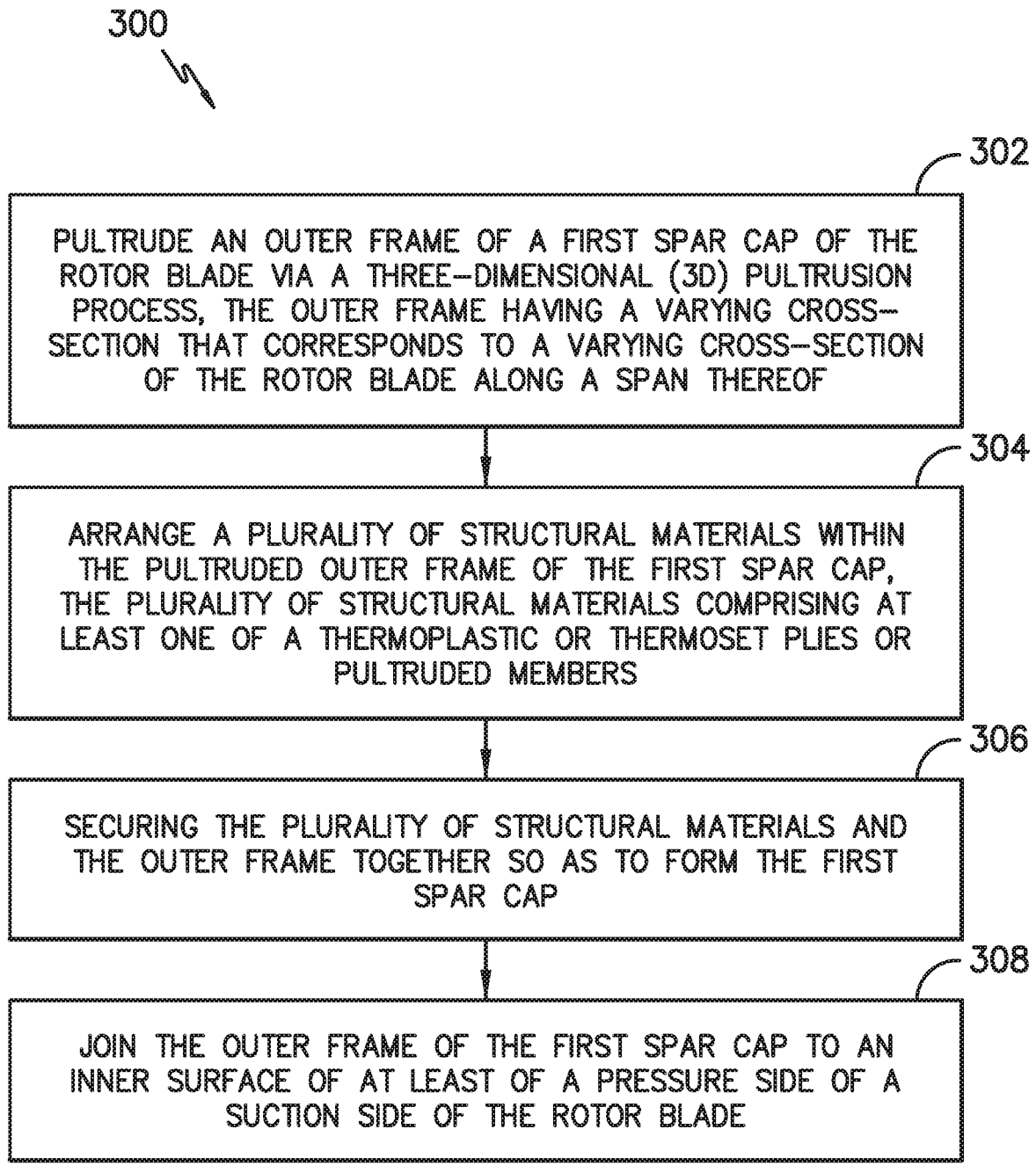
FIG. -16-

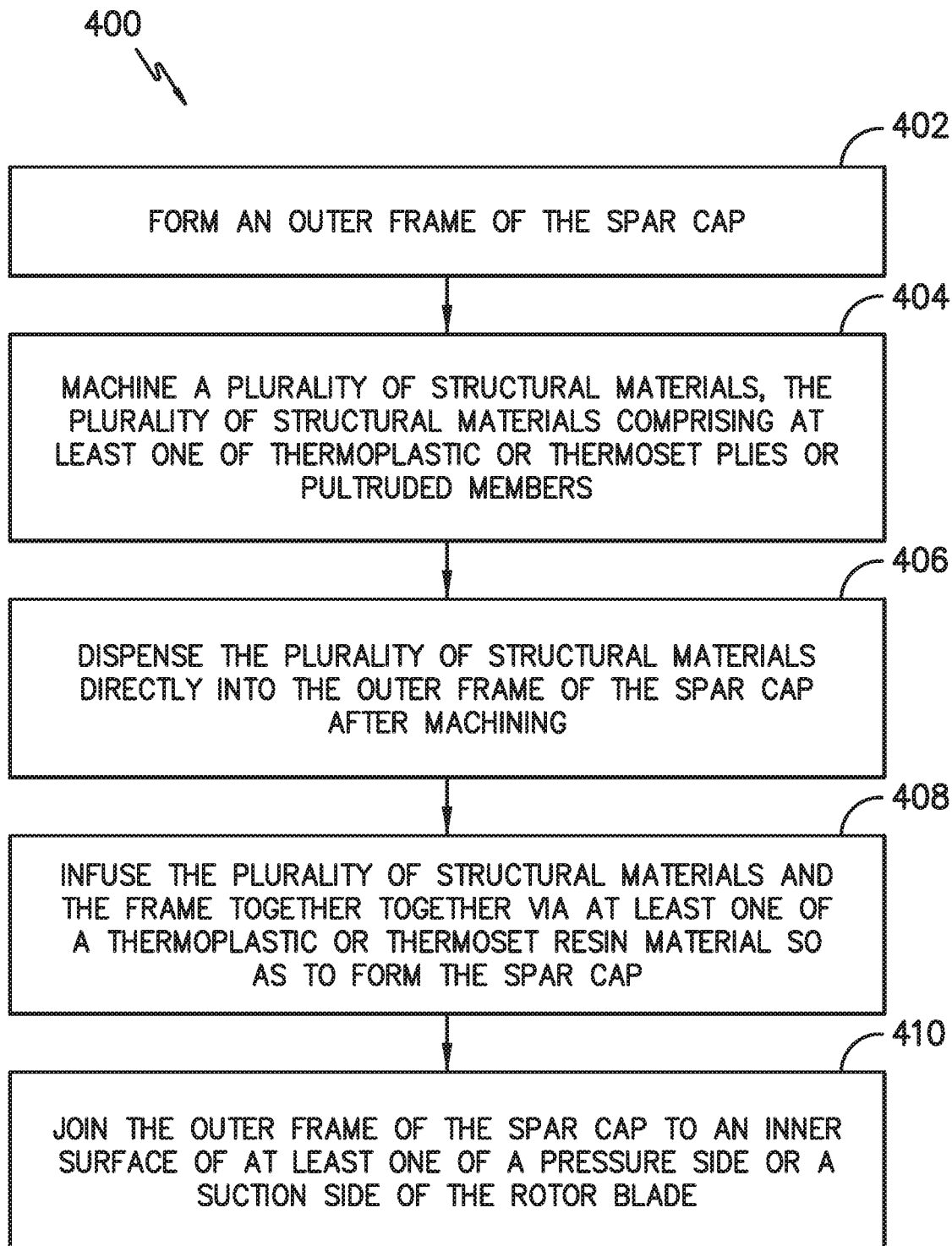
FIG. -17-

METHODS FOR MANUFACTURING SPAR CAPS FOR WIND TURBINE ROTOR BLADES

FIELD OF THE INVENTION

The present invention relates generally to the field of wind turbines, and more particularly to methods for manufacturing spar caps for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades are the primary elements for converting wind energy into electrical energy. The blades have the cross-sectional profile of an airfoil such that, during operation, air flows over the blade producing a pressure difference between the sides. Consequently, a lift force, which is directed from a pressure side surface towards a suction side surface, acts on the blade. The lift force generates torque on the main rotor shaft, which is geared to the generator for producing electricity.

The rotor blades typically consist of a suction side shell and a pressure side shell that are bonded together at bond lines along the leading and trailing edges of the blade. An internal shear web extends between the pressure and suction side shell members and is bonded to opposing spar caps affixed to the inner faces of the shell members. With typical blade configurations, the spar caps are continuous members that span the length of the rotor blade.

Many of the blade components are constructed of a composite laminate materials optionally reinforced with one or more fiber materials, e.g. via a resin infusion process. For example, conventional spar caps are formed using a vacuum-assisted resin transfer molding (VARTM). The VARTM process is a technique that uses vacuum pressure to drive resin into a mold. More specifically, plies or pultruded plates may be laid into the mold and covered with an infusion bag. Vacuum is then applied and resin is introduced into the spar cap mold to form the spar caps.

Once the pultruded plates are machined, however, transportation to the spar cap mold can be difficult. In addition, during the manufacturing process, the pultruded plates may shift within the mold before the components are infused together.

Accordingly, the industry would benefit from an improved manufacturing process for spar caps that addresses the aforementioned issues.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for manufacturing a spar cap of a rotor blade of a wind turbine. The method includes forming an outer frame of the spar cap via at least one of three-dimensional (3D) pultrusion, thermoforming, or 3D printing. As such, the outer frame has a varying cross-section that corresponds to a varying cross-section of the rotor blade along a span thereof. The method also includes arranging a plurality of structural materials within the pultruded outer frame of the spar cap. Further, the plurality of structural materials may include thermoplastic or thermoset plies or pultruded members. Another step includes infusing the plurality of structural materials and the outer frame together via a resin material so as to form the spar cap and allowing the spar cap to cure.

In one embodiment, the step of pultruding the outer frame of the spar cap may include pultruding the outer frame from a thermoplastic material reinforced with one or more fiber materials. In such embodiments, the fiber material(s) may include glass fibers, carbon fibers, metal fibers, polymer fibers, ceramic fibers, nanofibers, wood fibers, bamboo fibers, or combinations thereof.

In another embodiment, the step of pultruding the outer frame of the spar cap may include pultruding extended side edges of the outer frame. As such, in certain embodiments, the extended side edges may be configured as shear clips for attaching to a shear web of the rotor blade.

Alternatively, the method may include folding the extended side edges towards a center of the outer frame so as to retain the plurality of structural materials therein. In still alternative embodiments, the method may include folding the extended side edges away from a center of the outer frame to create opposing flanges of the outer frame and securing the flanges to the pressure side surface or the suction side surface of the rotor blade.

In further embodiments, the method may include removing the extended side edges from the outer frame. In additional embodiments, the method may include arranging a plurality of layers of the structural materials within the outer frame of the spar cap and arranging one or more non-structural layers between the layers of structural materials, the one or more non-structural materials comprising at least one of a glass veil, a continuous fiber mat, or a fabric material.

In another aspect, the method is directed to a method for manufacturing a spar cap of a rotor blade of a wind turbine. The method includes forming an outer frame of the spar cap. Further, the method includes machining a plurality of structural materials (e.g. thermoplastic or thermoset plies or pultruded members). Moreover, the method includes dispensing the structural material(s) directly into the outer frame of the spar cap after machining. As used herein, machining may include, but is not limited to cutting, chamfering, surface preparing (e.g. chemical, mechanical, or other), scoring, cleaning, labeling, coating, or any other suitable machining process. Another step includes infusing the plurality of structural materials and the outer frame together via at least one of a thermoplastic or thermoset resin material so as to form the spar cap. In addition, the method includes allowing the spar cap to cure.

In one embodiment, the step of forming the outer frame of the spar cap may include heating a thermoset or thermoplastic material and forming the material into a desired blade shape. Alternatively, the step of forming the outer frame of the spar cap may include pultruding the outer frame of the spar cap, e.g. via 3D pultrusion. In another embodiment, the step of machining the plurality of structural materials may include, for example, laser-jet cutting or water-jet cutting. It should also be understood that the method may further include any of the additional steps and/or features as described herein.

In yet another aspect, the present disclosure is directed to a spar cap for a rotor blade of a wind turbine. The spar cap includes a thermoplastic fiber-reinforced outer frame having a base, perpendicular side walls extending from the base, and an open end opposite the base. Further, the spar cap includes a plurality of structural materials arranged within the outer frame. As mentioned, the structural material(s) may include thermoplastic or thermoset plies or pultruded members. Moreover, the spar cap includes a cured resin material securing the plurality of structure materials within the outer frame.

In one embodiment, the outer frame may be formed via a 3D pultrusion process. In such embodiments, the outer frame may have a varying cross-section that corresponds to a varying cross-section of the rotor blade along a span thereof.

In another embodiment, the side walls of the outer frame may have one or more perforated lines or slots configured to increase flexibility thereof. It should also be understood that the spar cap may further include any of the additional features as described herein.

In still another aspect, the present disclosure is directed to a method for manufacturing a rotor blade of a wind turbine. The method includes forming an outer frame of the spar cap via at least one of 3D pultrusion, thermoforming, or 3D printing. As such, the outer frame has a varying cross-section that corresponds to a varying cross-section of the rotor blade along a span thereof. Further, the method includes arranging a plurality of structural materials within the pultruded outer frame of the first spar cap. The structural material(s) may include thermoplastic or thermoset plies or pultruded members. Another step includes securing the plurality of structural materials and the outer frame together so as to form the first spar cap. Further, the method includes joining the outer frame of the first spar cap to an inner surface of at least one of a pressure side surface or a suction side surface of the rotor blade.

In one embodiment, the step of joining the outer frame of the spar cap to the inner surface of the pressure side surface or the suction side surface of the rotor blade may include laying an outer skin layer of at least one of the pressure side surface or the suction side surface of the rotor blade into a shell mold, placing the outer frame of the spar cap adjacent to the outer skin, laying an inner skin layer of at least one of the pressure side surface or the suction side surface of the rotor blade atop the spar cap, and infusing the spar cap between the outer and inner skin layers.

In another embodiment, the method may include forming a second spar cap, joining one of the first and second spar caps to the pressure side surface and the other of the first and second spar caps to the suction side surface, and securing a shear web between the first and second spar caps.

In further embodiments, the method may include attaching one or more straps to extended side edges of the outer frame of the spar cap and placing the spar cap into the shell mold via the one or more straps. Alternatively, the method may include attaching one or more straps around the outer frame of the spar cap and placing the spar cap into the shell mold via the one or more straps.

In additional embodiments, the method may include securing one or more shear webs of the rotor blade to the extended side edges.

In yet another embodiment, the method may include folding the extended side edges towards a center of the outer frame so as to retain the plurality of structural materials therein (e.g. before infusion) and attaching a base of the outer frame to the inner surface of the pressure side surface or the suction side surface of the rotor blade. In alternative embodiments, the method may include folding the side edges away from the center of the outer frame to create opposing flanges and securing the flanges to the pressure side surface or the suction side surface of the rotor blade.

In still additional embodiments, the method may include removing the extended side edges from the outer frame. In further embodiments, the method may include arranging a plurality of layers of the structural materials within the outer frame of the spar cap and arranging one or more non-structural layers between the layers of structural materials, the one or more non-structural materials comprising at least one of a glass veil, a continuous fiber mat, or a fabric material.

It should also be understood that the method may further include any of the additional steps and/or features as described herein.

In a further aspect, the present disclosure is directed to a method for manufacturing a rotor blade of a wind turbine. The method includes forming an outer frame of the spar cap. Another step includes machining a plurality of structural materials, e.g. thermoplastic or thermoset plies or pultruded members. The method also includes dispensing the structural materials directly into the outer frame of the spar cap after machining. Further, the method includes infusing the plurality of structural materials and the outer frame together via at least one of a thermoplastic or thermoset resin material so as to form the spar cap. In addition, the method includes joining the outer frame of the spar cap to an inner surface of the pressure side surface or the suction side surface of the rotor blade.

In one embodiment, the step of joining the outer frame of the spar cap to the inner surface of the pressure side surface or the suction side surface may include laying an outer skin layer of at least one of the pressure side surface or the suction side surface of the rotor blade into a shell mold, placing the outer frame of the spar cap adjacent to the outer skin, laying an inner skin layer of at least one of the pressure side surface or the suction side surface of the rotor blade atop the spar cap, and infusing the spar cap between the outer and inner skin layers.

It should also be understood that the method may further include any of the additional steps and/or features as described herein.

In yet another aspect, the present disclosure is directed to a rotor blade of a wind turbine. The rotor blade includes a blade shell extending between a blade root and a blade tip and having a pressure side surface and a suction side surface extending between a leading edge and a trailing edge. Further, the rotor blade includes opposing spar caps configured with each of the pressure side surface and the suction side surface. Moreover, each of the opposing spar caps include a thermoplastic fiber-reinforced outer frame comprising a base, perpendicular side walls extending from the base, and an open end opposite the base. Further, each of the spar caps includes a plurality of structural materials arranged within the outer frame, the structural materials including either or both of thermoplastic or thermoset plies or pultruded members. In addition, each of the spar caps includes a cured resin material that secures the plurality of structure materials within the outer frame. It should also be understood that the rotor blade may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 illustrates a perspective view of one embodiment of a wind turbine according to the present disclosure;

FIG. 2 illustrates a perspective view of one embodiment of a modular rotor blade of a wind turbine according to the present disclosure;

FIG. 3 illustrates an exploded view of the modular rotor blade of FIG. 2;

FIG. 4 illustrates a cross-sectional view of one embodiment of a leading edge segment of a modular rotor blade according to the present disclosure;

FIG. 5 illustrates a cross-sectional view of one embodiment of a trailing edge segment of a modular rotor blade according to the present disclosure;

FIG. 6 illustrates a cross-sectional view of the modular rotor blade of FIG. 2 according to the present disclosure along line 6-6;

FIG. 7 illustrates a cross-sectional view of the modular rotor blade of FIG. 2 according to the present disclosure along line 7-7;

FIG. 8 illustrates a flow diagram of one embodiment of a method for manufacturing a spar cap of a rotor blade of a wind turbine according to the present disclosure;

FIG. 9 illustrates a partial perspective view of one embodiment of a spar cap according to the present disclosure;

FIG. 10 illustrates a partial perspective view of one embodiment of an outer frame of a spar cap according to the present disclosure, particularly illustrating perforated lines in the side walls of the outer frame;

FIG. 11 illustrates a partial perspective view of one embodiment of an outer frame of a spar cap according to the present disclosure, particularly illustrating slots or gaps in the side walls of the outer frame;

FIG. 12 illustrates a cross-sectional view of one embodiment of a rotor blade according to the present disclosure, particularly illustrating opposing spar caps configured with the pressure and suction side surfaces of the rotor blade;

FIG. 13 illustrates a cross-sectional view of another embodiment of a rotor blade according to the present disclosure, particularly illustrating opposing spar caps configured with the pressure and suction side surfaces of the rotor blade and a shear web configured therebetween;

FIG. 14 illustrates a cross-sectional view of one embodiment of a spar cap according to the present disclosure, particularly illustrating one or more straps configures with the sides walls of the outer frame of the spar cap;

FIG. 15 illustrates a flow diagram of another embodiment of a method for manufacturing a spar cap of a rotor blade of a wind turbine according to the present disclosure;

FIG. 16 illustrates a flow diagram of one embodiment of a method for manufacturing a rotor blade of a wind turbine according to the present disclosure; and FIG. 17 illustrates a flow diagram of another embodiment of a method for manufacturing a rotor blade of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Generally, the present disclosure is directed methods for manufacturing spar caps for wind turbine rotor blades. More specifically, in certain embodiments, the method includes forming an outer frame of the spar cap via at least one of 3D pultrusion, thermoforming, or 3D printing. As such, the outer frame has a varying cross-section that corresponds to a varying cross-section of the rotor blade along a span thereof. The method also includes arranging a plurality of structural materials (e.g. layers of pultruded plates) within the pultruded outer frame of the spar cap and infusing the structural materials and the outer frame together via a resin material so as to form the spar cap. The resulting spar cap can then be easily incorporated into conventional rotor blade manufacturing processes and/or welded or bonded to an existing rotor blade.

Thus, the present subject matter provides numerous advantages not present in the prior art. For example, the present disclosure provides a method for manufacturing spar caps that does not require the use of conventional spar cap molds. As such, the present disclosure eliminates the need to transport pultruded plates to the spar cap mold which can be difficult. Moreover, the method of the present disclosure reduces the need for certain consumable materials.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Referring now to FIGS. 2 and 3, various views of a rotor blade 16 according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 constructed, at least in part, from a thermoset and/or a thermoplastic material and at least one blade segment 21 configured with the main blade structure 15. More specifically, as shown, the rotor blade 16 includes a plurality of blade segments 21. The blade segment(s) 21 may also be constructed, at least in part, from a thermoset and/or a thermoplastic material.

The thermoplastic rotor blade components and/or materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, poly sulphones, and/or imides. More specifically, exemplary amorphous thermoplastic materials may include polystyrene, acrylonitrile butadiene styrene (ABS), polymethyl methacrylate (PMMA), glycolic polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluoropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyether ketone, or any other suitable semi-crystalline thermoplastic material.

Further, the thermoses components and/or materials as described herein generally encompass a plastic material or polymer that is non-reversible in nature. For example, thermoses materials, once cured, cannot be easily refolded or returned to a liquid state. As such, after initial forming, thermoses materials are generally resistant to heat, corrosion, and/or creep. Example thermoses materials may generally include, but are not limited to, some polyesters, some polyurethane, esters, epoxies, or any other suitable thermoses material.

In addition, as mentioned, the thermoplastic and/or the thermoses material as described herein may optionally be reinforced with a fiber material, including but not limited to glass fibers, carbon fibers, polymer fibers, ceramic fibers, nanofibers, wood fibers, bamboo fibers, metal fibers, or similar or combinations thereof. In addition, the direction of the fibers may include biaxial, unidirectional, triaxial, or any other another suitable direction and/or combinations thereof. Further, the fiber content may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 40 of the rotor blade 16 and a trailing edge 42 of the rotor blade 16. As is generally understood, the chord 25 may generally vary in length with respect to the span 23 as the rotor blade 16 extends from the blade root section 20 to the blade tip section 22.

Referring particularly to FIGS. 2-7, any number of blade segments 21 having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. In addition, the blade segments 21 may be constructed of any suitable materials, including but not limited to a thermoses material or a thermoplastic material optionally reinforced with one or more fiber materials. More specifically, in certain embodiments, the blade segments 21 may include any one of or combination of the following blade segments: pressure and/or suction side segments 44, 46, (FIGS. 2 and 3), leading and/or trailing edge segments 24, 26 (FIGS. 2-6), a non-jointed segment, a single-jointed segment, a multi-jointed blade segment, a J-shaped blade segment, or similar.

More specifically, as shown in FIG. 4, the leading edge segments 24 may have a forward pressure side surface 28 and a forward suction side surface 30. Similarly, as shown in FIG. 5, each of the trailing edge segments 26 may have an aft pressure side surface 32 and an aft suction side surface 34. Thus, the forward pressure side surface 28 of the leading edge segment 24 and the aft pressure side surface 32 of the trailing edge segment 26 generally define a pressure side surface of the rotor blade 16. Similarly, the forward suction side surface 30 of the leading edge segment 24 and the aft suction side surface 34 of the trailing edge segment 26 generally define a suction side surface of the rotor blade 16. In addition, as particularly shown in FIG. 6, the leading edge segment(s) 24 and the trailing edge segment(s) 26 may be joined at a pressure side seam 36 and a suction side seam 38. For example, the blade segments 24, 26 may be configured to overlap at the pressure side seam 36 and/or the suction side seam 38. Further, as shown in FIG. 2, adjacent blade segments 24, 26 may be configured to overlap at a seam 54. Thus, where the blade segments are constructed at least partially of a thermoplastic material, adjacent blade segments 21 can be welded together along the seams 36, 38, 54, which will be discussed in more detail herein. Alternatively, in certain embodiments, the various segments of the rotor blade 16 may be secured together via an adhesive 56 (or mechanical fasteners) configured between the overlapping leading and trailing edge segments 24, 26 and/or the overlapping adjacent leading or trailing edge segments 24, 26.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In addition, the spar caps 48, 50, 51, 53 may be constructed of any suitable materials, e.g. a thermoplastic or thermoses material or combinations thereof. Further, the spar caps 48, 50, 51, 53 may be pultruded from thermoplastic or thermoses resins. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of two-dimensional (2D) pultrusion is typically characterized by a continuous process of composite materials that produces composite parts having a constant cross-section. Thus, the pre-cured composite materials may include pultrusions constructed of reinforced thermoses or thermoplastic materials. Further, the spar caps 48, 50, 51, 53 may be formed of the same pre-cured composites or different pre-cured composites. In addition, the pultruded components may be produced from rovings, which generally encompass long and narrow bundles of fibers that are not combined until joined by a cured resin.

Further, 3D pultrusion is generally characterized by a manufacturing process similar to 2D pultrusion, but that can accommodate three-dimensional curved profiles. In addition, 3D pultrusion processes can be used to generate pultruded components having a variety of non-linear or variable cross-sectional shapes rather than a constant cross-section.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 24, 26 can be mounted thereto.

Referring now to FIGS. 8-17, improved methods for manufacturing rotor blades and various components thereof, such as spar caps, are illustrated. More specifically, as shown in FIG. 8, a flow diagram of one embodiment of a method 100 for manufacturing a spar cap (e.g. the spar caps 48, 50) of the rotor blade 16 of the wind turbine 10 is illustrated. As shown at 102, the method 100 includes forming the outer frame 58 of the spar cap 48 via at least one of 3D pultrusion, thermoforming, or 3D printing. More specifically, in one embodiment, the step of pultruding the outer frame 58 of the spar cap 48 may include pultruding the outer frame 58 from a thermoplastic material reinforced with one or more fiber materials. In such embodiments, the fiber material(s) may include glass fibers, carbon fibers, metal fibers, polymer fibers, ceramic fibers, nanofibers, wood fibers, bamboo fibers, or combinations thereof. Thus, as shown in FIG. 9, the outer frame 58 may be a thermoplastic fiber-reinforced component having a base 64, perpendicular side walls 66 extending from the base 64, and an open end 70 opposite the base 64. In further embodiments, the outer frame 58 may have a varying cross-section that corresponds to a varying cross-section of the rotor blade 16 along the span 23 thereof. In additional embodiments, the base 64 may act as a layer of structural material, thereby reducing the number of layers of additional structural material 60 needed within the spar caps 48, 50, which is discussed in more detail below.

In another embodiment, the step of pultruding the outer frame 58 of the spar cap 48 may include pultruding extended side edges 68 of the outer frame 58. For example, as shown in FIGS. 9 and 13 (lower spar cap 48), the extended side edges 68 may be configured as shear clips 75 for attaching to the shear web 35 of the rotor blade 16. In addition, as shown in FIG. 14, the extended side edges 68 may be used at attachment points for one or more straps 72 that can be attached to the outer frame 58 of the spar cap 48. As such, the outer frame 58 of the spar cap 48 can be easily lifted and/or moved, e.g. via a crane 86, during the manufacturing process. In such embodiments, a spacer 84 may be used in conjunction with the open end 70 of the outer frame 58 so as to prevent the side edges 68 from collapsing inward as the spar cap 48 is being lifted.

Alternatively, as shown in FIG. 12 (upper spar cap 50), the method 100 may include folding the extended side edges 68 towards a center 80 of the outer frame 58 so as to retain the structural material(s) 60 therein, e.g. before the structural material(s) 60 are secured within the outer frame 58. In still alternative embodiments, as shown in FIG. 13 (upper spar cap 50), the method 100 may include folding the extended side edges 68 away from the center 80 of the outer frame 58 to create opposing flanges 82. Thus, as shown, the method 100 may also include securing the flanges 82 to the pressure side surface 31 and/or the suction side surface 33 of the rotor blade 16. In further embodiments, as shown in FIG. 12 (lower spar cap 48), the method 100 may include removing the extended side edges 68 from the outer frame 58.

Referring back to FIG. 8, as shown at 104, the method 100 also includes arranging a plurality of structural materials 60 within the pultruded outer frame 58 of the spar cap 48. More specifically, the structural material(s) 60 may include thermoplastic or thermoses plies or pultruded members or plates. Further, as shown in FIGS. 9 and 12-14, the method 100 may include arranging a plurality of layers 74 of the structural materials 60 within the outer frame 58 of the spar cap 48 and arranging one or more non-structural layers 77 between the layers 74 of structural materials 60. More specifically, in certain embodiments, the non-structural material(s) 77 may include a glass veil, a continuous fiber mat, or a fabric material (such as a light weight biaxial glass fabric). Thus, the non-structural layers 77 are configured to serve as process aids and joining media for various infusion processes by, e.g. promoting resin flow, wet out, and ultimately, resin connections between the structural layers 74. Additionally, both non-pultruded structural layers and/or non-structural layers (essentially flexible conforming layers) can be used to help fill any gaps or voids between the stack of layers and the outer frame 58.

Referring still to FIG. 8, as shown at 106, the method 100 includes infusing the structural materials 60 and the outer frame 58 together via a resin material 62 so as to form the spar cap 48. More specifically, the structural material(s) 60 and the outer frame 58 may be infused together via injection molding, thermoforming, vacuum forming, or vacuum infusion. As such, the outer frame 58 is configured to maintain the structural material(s) 60 of the spar cap 48 in their desired location before then components are joined or infused together. Further, in one embodiment, the resin material 62 may include at least one of a thermoses material, a thermoplastic material, or similar, or combinations thereof. Thus, as shown at 108, the method 100 may include allowing the spar cap 48 to cure.

In another embodiment, as shown in FIGS. 10 and 11, the side walls 66 of the outer frame 58 may include one or more features configured for increasing the flexibility thereof. As such, the outer frame 58 can be easily mounted to any of the blade surfaces. For example, as shown in FIG. 10, the side walls 66 of the outer frame 58 include a plurality of perforated lines 76. As such, the perforated lines 76 allow the side walls 66 to bend and flex with the curvature of a variety of blade surfaces. Alternatively, as shown in FIG. 11, the side walls 66 of the outer frame 58 may include one or more slots 78 or gaps configured to increase flexibility thereof. Another advantage of providing the slots 78 or gaps in the side walls 66 includes allowing the resin material to more easily flow in and around the outer frame 58 when infusing the structural materials 60 therein.

Referring now to FIG. 15, a flow diagram of another embodiment of a method 200 for manufacturing a spar cap of the rotor blade 16 of the wind turbine 10 is illustrated. As shown at 202, the method 200 includes forming an outer frame of the spar cap (e.g. spar caps 48, 50). More specifically, in one embodiment, the step of forming the outer frame 58 of the spar cap 48 may include heating a thermoses or thermoplastic material and forming the material into a desired blade shape. Alternatively, the step of forming the outer frame 58 of the spar cap 48 may include forming the outer frame 58 via at least one of 3D pultrusion, thermoforming, or 3D printing.

Further, as shown at 204, the method 200 includes machining a plurality of structural materials 60. More specifically, as used herein, the step of machining may include, but is not limited to cutting (e.g. laser-jet, water-jet), chamfering, surface preparing (e.g. chemical, mechanical, or other), scoring, cleaning, labeling, coating, or any other suitable machining process. Further, as mentioned, the structural material(s) 60 as described herein may include thermoplastic or thermoses plies or pultruded members. As shown at 206, the method 200 includes dispensing the structural material(s) 60 directly into the outer frame 58 of the spar cap 48 after machining. Thus, in such embodiments, conventional spar cap molds can thereby be eliminated.

Referring still to FIG. 15, as shown at 206, the method 200 includes infusing the structural material(s) 60 and the outer frame 58 together via at least one of a thermoplastic or thermoses resin material so as to form the spar cap 48. More specifically, as mentioned, the structural material(s) 60 and the outer frame 58 may be infused together via injection molding, thermoforming, vacuum forming, or vacuum infusion. In addition, as shown at 208, the method 200 includes allowing the spar cap 48 to cure.

Referring now to FIG. 16, a flow diagram of one embodiment of a method 300 for manufacturing a rotor blade 16 of a wind turbine 10 is illustrated. As shown at 302, the method 300 includes forming the outer frame 58 of the spar cap 48 via at least one of 3D pultrusion, thermoforming, or 3D printing. As such, the outer frame 58 has a varying cross-section that corresponds to a varying cross-section of the rotor blade 16 along the span 23 thereof. As shown at 304, the method 300 includes arranging a plurality of structural materials 60 (e.g. thermoplastic or thermoses plies or pultruded members or plates) within the pultruded outer frame 58 of the first spar cap 48. As shown at 306, the method 300 includes securing the structural material(s) 60 and the outer frame 58 together so as to form the first spar cap 48.

Further, as shown at 308, the method 300 includes joining the outer frame 58 of the first spar cap 48 to an inner surface of at least one of the pressure side surface 31 or the suction side surface 33 of the rotor blade 16. More specifically, in one embodiment, the step of joining the outer frame 58 of the spar cap 48 to the inner surface of the pressure side surface 31 or the suction side surface 33 may include laying an outer skin layer of at least one of the pressure side surface 31 or the suction side surface 33 into a shell mold, placing the outer frame 58 of the spar cap 48 adjacent to the outer skin, laying an inner skin layer of at least one of the pressure side surface 31 or the suction side surface 33 atop the spar cap 48, and infusing the spar cap 48 between the outer and inner skin layers. Alternatively, the outer frame 58 of the spar cap 48 may be joined to either of the pressure or suction side surfaces 31, 33 via welding or bonding.

In another embodiment, as shown in FIG. 13, the method 300 may include forming a second spar cap 50, joining one of the first and second spar caps 48, 50 to the pressure side surface 31 and the other of the first and second spar caps 48, 50 to the suction side surface 33, and securing the shear web 35 between the first and second spar caps 48, 50. More specifically, as shown, the method 300 may include securing the shear web(s) 35 to the extended side edges 68 of the outer frame(s) 58 of the spar caps 48, 50.

In further embodiments, as shown in FIG. 14, the method 300 may include attaching one or more straps 72 to the extended side edges 68 of the outer frame 58 of the spar cap 48 (e.g. at one or more attachment locations 88) and placing the spar cap 48, e.g. via a lifting device 86 such as a crane, fork lift, or similar, into the shell mold via the straps 72. Alternatively, the method 300 may include attaching one or more straps 72 around the outer frame 58 of the spar cap 48 (as indicated by the dotted line) and placing the spar cap 48 into the shell mold via the straps 72.

Referring now to FIG. 17, a flow diagram of one embodiment of a method 400 for manufacturing a rotor blade 16 of a wind turbine 10 is illustrated. As shown at 402, the method 400 includes forming an outer frame 58 of the spar cap (e.g. one of the spar caps 48, 50). As shown at 404, the method 400 includes machining a plurality of structural material(s) 60, such as those described herein. As shown at 406, the method 400 includes dispensing the plurality of structural materials 60 directly into the outer frame 58 of the spar cap 48 after machining. As shown at 408, the method 400 includes infusing the plurality of structural materials 60 and the outer frame 58 together via at least one of a thermoplastic or thermoses resin material so as to form the spar cap 48. As shown at 402, the method 410 includes joining the outer frame 58 of the spar cap 48 to an inner surface of at least one of a pressure side surface 31 or the suction side surface 33 of the rotor blade 16.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for manufacturing a spar cap of a rotor blade of a wind turbine, the method comprising:

pultruding an outer frame of the spar cap via at least one of three-dimensional (3D) pultrusion or two-dimensional (2D) pultrusion, the outer frame having a varying cross-section that corresponds to a varying cross-section of the rotor blade along a span thereof, wherein pultruding the outer frame of the spar cap further comprises pultruding extended side edges of the outer frame, the extended side edges configured as shear clips for attaching to a shear web of the rotor blade;

arranging a plurality of structural materials within the pultruded outer frame of the spar cap, the plurality of structural materials comprising at least one of thermoplastic or thermoset plies or pultruded members;

folding the extended side edges towards a center of the outer frame so as to retain the plurality of structural materials therein;

infusing the plurality of structural materials and the pultruded outer frame together via a resin material so as to form the spar cap; and, allowing the spar cap to cure.

2. The method of claim 1, the plurality of structural materials further comprising one or more fiber materials, the one or more fiber materials comprising at least one of glass fibers, carbon fibers, metal fibers, polymer fibers, ceramic fibers, nanofibers, wood fibers, bamboo fibers, or combinations thereof.

3. The method of claim 1, further comprising arranging a plurality of layers of the structural materials within the outer frame of the spar cap and arranging one or more non-structural layers between the layers of structural materials, the one or more non-structural materials comprising at least one of a glass veil, a continuous fiber mat, or a fabric material.

4. A method for manufacturing a spar cap of a rotor blade of a wind turbine, the method comprising:

forming an outer frame of the spar cap, the outer frame comprising extended side edges;

machining a plurality of structural materials, the plurality of structural materials comprising at least one of thermoplastic or thermoset plies or pultruded members;

dispensing the plurality of structural materials directly into the outer frame of the spar cap after machining;

folding the extended side edges towards a center of the outer frame so as to retain the plurality of structural materials therein;

infusing the plurality of structural materials and the outer frame together via at least one of a thermoplastic or thermoset resin material so as to form the spar cap; and, allowing the spar cap to cure.

5. The method of claim 4, wherein forming the outer frame of the spar cap further comprises heating at least one of a thermoset or thermoplastic material and forming the material into a desired blade shape.

6. The method of claim 4, wherein forming the outer frame of the spar cap further comprises pultruding the outer frame of the spar cap via three-dimensional (3D) pultrusion.

7. The method of claim 6, wherein pultruding the outer frame of the spar cap further comprises pultruding the extended side edges of the outer frame.

8. The method of claim 4, wherein the outer frame of the spar cap is formed from a thermoplastic material reinforced with one or more fiber materials, wherein the one or more fiber materials comprise at least one of glass fibers, carbon fibers, metal fibers, polymer fibers, ceramic fibers, nanofibers, wood fibers, bamboo fibers, or combinations thereof.

9. The method of claim 4, further comprising arranging a plurality of layers of the structural materials within the outer frame of the spar cap and arranging one or more non-structural layers between the layers of structural materials, the one or more non-structural materials comprising at least one of a glass veil, a continuous fiber mat, or a fabric material.

* * * * *